United States Patent [19]

Curtil

[11] 4,424,790

[45] Jan. 10, 1984

[54] METHOD OF IMPROVING THE EFFICIENCY OF A SUPERCHARGED DIESEL ENGINE

[75] Inventor: Remi Curtil, Montsoult, France

[73] Assignee: Societe d'Etudes de Machines Thermiques, S.E.M.T., Saint-Denis, France

[21] Appl. No.: 377,142

[22] Filed: May 11, 1982

Related U.S. Application Data

[63] Continuation of Ser. No. 113,968, Jan. 21, 1980, abandoned.

[30] Foreign Application Priority Data

Feb. 5, 1979 [FR] France .................................. 79 02877

[51] Int. Cl.³ ............................................ F02M 25/06
[52] U.S. Cl. ................................... 123/559; 123/90.6; 123/569
[58] Field of Search ........................... 60/598, 600–603, 60/605; 123/90.6, 432, 559, 568, 569

[56] References Cited

U.S. PATENT DOCUMENTS

| | | | |
|---|---|---|---|
| 1,952,881 | 3/1934 | Minter | 123/568 |
| 3,298,332 | 1/1967 | Elsbett | 123/90.6 X |
| 3,412,552 | 11/1968 | Elsbett | 60/605 |
| 4,075,990 | 2/1978 | Ribeton | 60/602 X |
| 4,246,874 | 1/1981 | Nakagawa et al. | 123/432 X |

FOREIGN PATENT DOCUMENTS

| | | | |
|---|---|---|---|
| 569632 | 1/1959 | Canada | 60/605 |
| 1041230 | 5/1953 | France | 60/605 |

*Primary Examiner*—Michael Koczo
*Attorney, Agent, or Firm*—Kenyon & Kenyon

[57] ABSTRACT

The invention relates to a method and a device for improving the efficiency of a four-stroke-cycle internal combustion engine. The main purpose of the invention is to obtain an effective compression ratio that is capable of automatic variation without introducing additional elements whatever the load, but only by adapting the engine cycle timing diagram. Said timing diagram includes an overlap stage between the lifts of at least one exhaust valve and at least one intake valve, said intake valve being closed near or before the bottom dead center of the piston, and said exhaust valve being closed beyond the instant of fixed closing of the intake valve.

6 Claims, 9 Drawing Figures

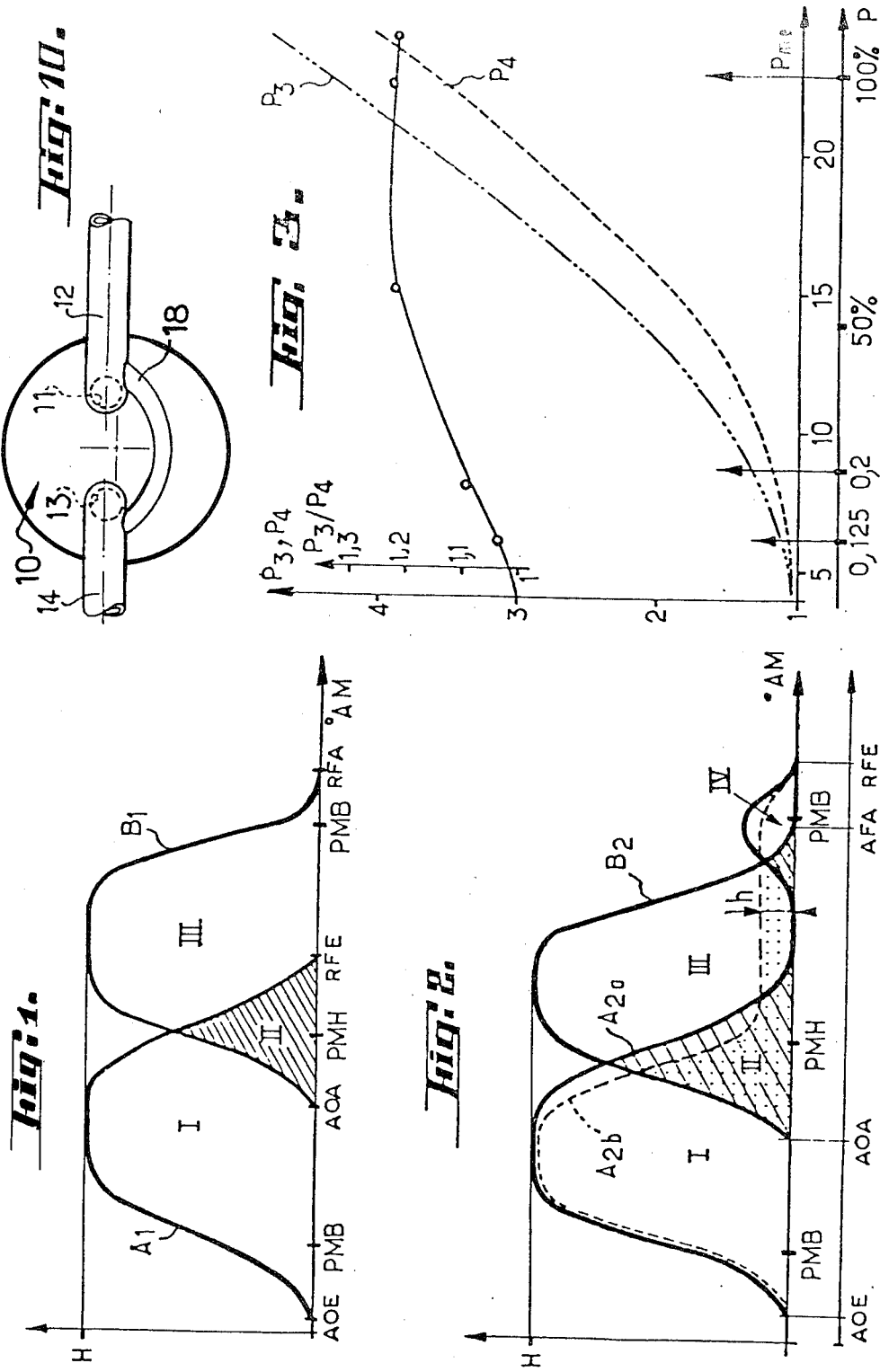

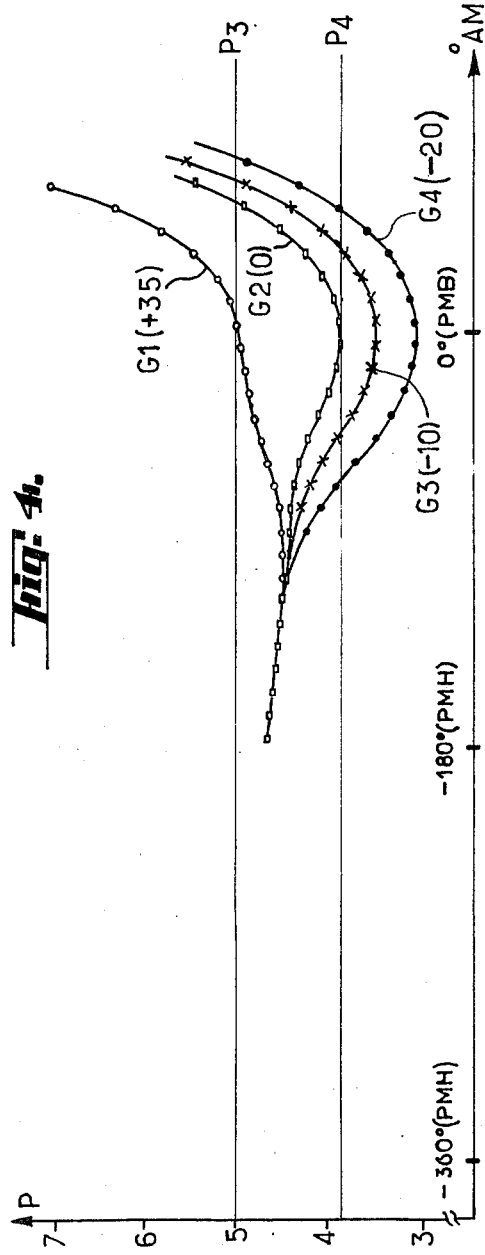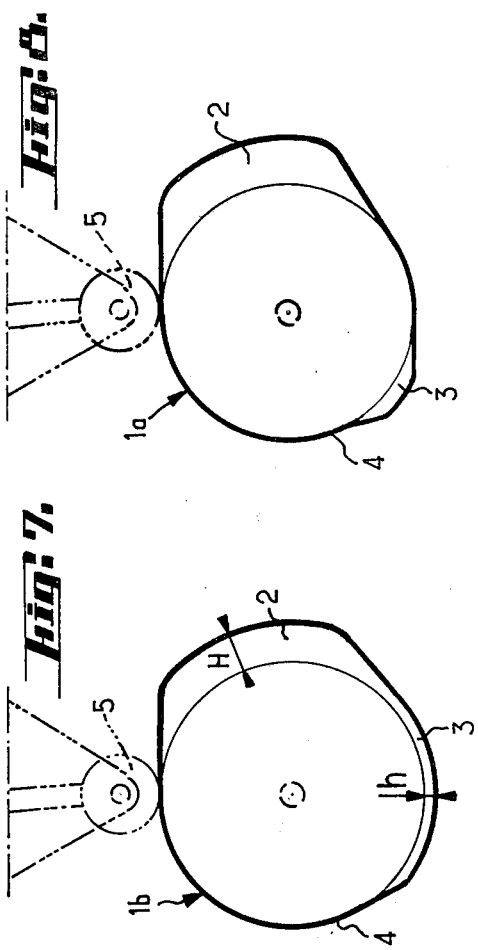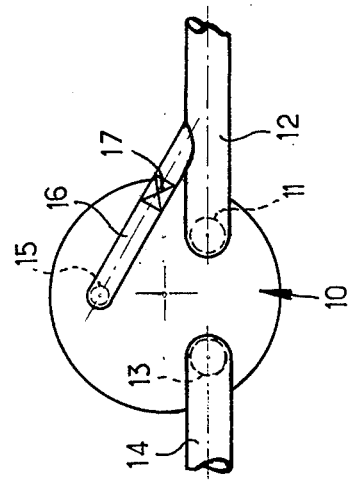

METHOD OF IMPROVING THE EFFICIENCY OF A SUPERCHARGED DIESEL ENGINE

This is a continuation of application Ser. No. 113,968 filed Jan. 21, 1980 and subsequently abandoned.

The present invention relates generally to a method of improving the efficiency of a four-stroke-cycle internal combustion engine such as a Diesel engine, particularly a Diesel engine supercharged at constant pressure.

The optimum operating conditions of an engine, which are calculated for nominal loads, are impaired particularly during starting, under partial loads, and under heavy loads.

In a Diesel engine, the compression ratio at heavy loads is usually limited in order to reduce the pressures at the end of the compression stroke. According to a method developed for gas engines and known as the Miller cycle (see "A 4-Stroke High Speed Diesel Engine With Two-Stage of Supercharging and Variable Compression Ratio" by G. Zappa and T. Franca; 13th International Congress on Combustion Engines, CIMAC, Vienna 1979), pressure limitation at the end of the compression stroke is obtained by providing a variable effective compression ratio that is maximum during starting and minimum under heavy load. To this end, the closing of the intake valve is advanced with respect to bottom dead center, the closing instant being dependent on the value of the load. This closing lead (which is maximum under heavy load) permits an expansion of the charge of air contained in the cylinder, thus reducing the effective travel of the piston during the compression stage.

Fuel ignition in a Diesel engine being obtained by raising the temperature of the charge of air in the cylinder during the compression stage, a compression ratio of a certain value is necessary to ignite the fuel under any engine operating conditions. Now this temperature at the end of the compression stroke may prove insufficient, particularly under partial loads and during starting. Several known methods allow this deficiency to be remedied by heating the charge of air present in the cylinder before the compression stage. Among such methods the following may be mentioned:

making up by means of an external source of heat,
modifying the timing of the engine cycle stages so as to recycle the gases present in the exhaust manifold conduit.

The second solution falls within the scope of the invention and is described in particular in French Pat. No. 2,271,393, in which provision is made for recycling the exhaust gases present in the exhaust manifold conduit by partially reintroducing them into the cylinder so as to heat the charge of intake air. Such recycling is obtained by keeping the exhaust valve partially open during the intake stage.

Worthwhile noting in this French patent is the provision, during starting as well as under any engine operating conditions, for maintaining the exhaust valves open at the end of the exhaust stroke and during the major part of the intake stroke. Also pointed out in this patent is the fact that, during starting, it is preferable to artificially increase the counter-pressure at the cylinder exhaust by means of appropriate devices such as valves.

The main purpose of the invention is to obtain an effective compression ratio that is capable of automatic variation without introducing additional elements whatever the load, but only by so adapting the engine cycle timing diagram as to effectively solve the problems arising under heavy loads, and also, in particular, under light loads on the propeller laws and during starting. It should indeed be borne in mind that, as a rule, obtaining of an engine torque equal to the one that occurs at low speeds on a propeller law, and a fortiori obtaining higher torques, is rendered increasingly difficult by the increase in nominal effective mean pressures (higher than 20 to 25 bars) in turbosupercharged four-stroke-cycle engines.

The purpose of the invention is therefore to improve the efficiency of a four-stroke-cycle internal combustion engine such as a Diesel engine, particularly a Diesel engine supercharged at constant pressure, the timing diagram of which includes an overlap stage between the lifts of at least one exhaust valve and at least one intake valve, which comprises closing the intake valve near or slightly before the bottom dead center of the piston, characterized in that it comprises closing the exhaust valve beyond the instant of fixed closing of the intake valve, in order, during the gradual increase in engine load, to automatically and gradually reduce, from starting to nominal power, the effective compression ratio and the temperatures at the end of the compression stroke, by concomitantly diminishing the amount of gases present in the exhaust conduit and consisting of burned gases or fresh air, re-inducted into the cylinder near bottom dead center, according to the natural variation of the relation between the supercharging air pressure and the counter-pressure at the cylinder exhaust.

According to another characterizing feature of the invention, the said method comprises closing the exhaust valve during the major part of the intake stage, partially re-opening the exhaust valve and re-closing it after the closing of the intake valve.

According to another characterizing feature of the invention, the said method comprises maintaining a partial lift of the exhaust valve during the major part of the intake stage and maintaining the said partial lift beyond the instant of closing of the intake valve.

According to an important advantage of the invention, the re-induction of air or of gas from the exhaust manifold into the cylinder is controlled automatically by the natural variation of the counter-pressure in the exhaust manifold compared to the intake air pressure depending on load and speed.

According to another important advantage of the invention, provision is made to retain the advantages of the Miller system under heavy loads as well as very-light-load and starting conditions without making use of devices and control means therefor for varying the timing of the air intake control means of the engine in accordance with the engine load.

Other advantages, characterizing features and details will appear more clearly as the following explanatory description proceeds with reference to the appended drawings given solely by way of example and wherein:

FIG. 1 shows graphically the exhaust valve lift (curve A1) and the intake valve lift (curve B1) as functions of the angle of rotation of the crank-shaft (°AM) of an engine with a conventional valve timing diagram;

FIG. 2 shows graphically the exhaust valve lift according to two forms of embodiment of the invention illustrated by the curves (A2a) and (A2b), respectively, as a function of the angle of rotation of the crank shaft, and the intake valve lift (curve B2);

FIG. 3 is a graphical representation of the pressures in the intake manifold (curve P3) and the exhaust manifold (curve P4), respectively, according to the propeller law, and of the P3/P4 ratio, also according to the propeller law, as functions of the effective mean pressure and the power (only the effective mean pressure Pme varies linearly);

FIG. 4 shows graphically the pressure in the cylinder at different instants of intake valve closing in the case of the invention, and for an engine with a conventional valve timing diagram with intake valve closing for example at 35° after bottom dead center;

FIG. 7 is a diagrammatic view of the exhaust valve actuating cam for obtaining the developed curve (A2b) represented in FIG. 2;

FIG. 8 is a diagrammatic view of the exhaust valve actuating cam for obtaining the curve (A2a) represented in FIG. 2; and FIG. 9 is a diagrammatic view of a complementary device associated with the method according to the invention.

FIG. 10 is a diagrammatic view of an alternative complementary device associated with the method according to the invention.

Figure 5:
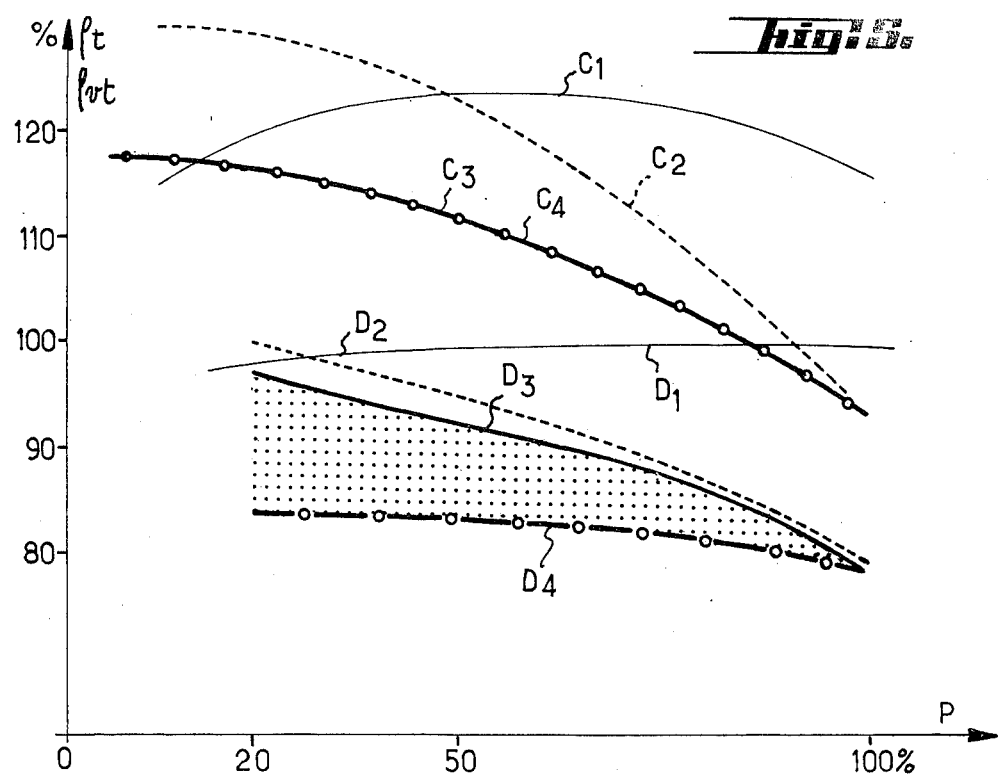
FIG. 5 shows, in one and the same graph, two series of curves corresponding to the various volumetric efficiencies and admission or filling ratios i.e., trapping efficiencies), respectively, as functions of power (according to the propeller law), obtained for different valve timing diagrams including the one according to the invention.

The conventional timing diagram illustrated in FIG. 1 may be divided into three regions:
- region I: conventional exhaust stage with exhaust opening lead (AOE) with respect to bottom dead center (PMB) and exhaust closing lag (RFE) with respect to top dead center (PMH);
- region II: scavenging stage with overlap between the intake and exhaust valves (hatched region),
- region III: conventional intake stage with intake opening lead (AOA) with respect to top dead center (PMH) and intake closing lag (RFA) subsequent to bottom dead center.

The timing diagram according to the invention shown in FIG. 2 is composed of four stages:
- stage I: identical with stage I above;
- stage II: in the case of curve A2a, the scavenging stage is substantially identical with stage II above; as for curve A2b with residual lift of the exhaust valve, the overlap section results substantially in the same scavenging ratio as in the case of curve A2a (hatched regions);
- stage III: identical with stage III above, but with intake valve closing lead (AFA) with respect to bottom dead center (PMB);
- stage IV: this stage is new and corresponds to a complementary admission stage automatically controlling the communication between the exhaust manifold and the cylinder by means of the exhaust valve. In the case of curve A2a, the exhaust valve is closed and then re-opened near the intake valve closing instant before being slightly re-closed after bottom dead center. In the case of curve A2b, the exhaust valve is maintained partially open during the major part of the intake stage and is kept in that position beyond the intake valve closing instant and then slightly re-closed beyond bottom dead center.

Let us consider a four-stroke-cycle internal combustion engine of the supercharged Diesel type and examine its operation under various conditions, from the heaviest loads to starting.

Under heavy loads (from 50 to 100% power and overload, FIG. 3).

During the period of overlap between the exhaust and intake valves (stage II in FIG. 2), cylinder scavenging takes place normally, because under heavy loads the pressure at the intake is considerably higher than the counter-pressure in the exhaust manifold conduit (P3>P4, FIG. 3).

The closing of the intake valve before bottom dead center allows an expansion, within the cylinder, of the air charge admitted during the end of the piston downward motion. In this manner, the effective compression stroke of the piston is reduced in order to limit pressure at the end of the compression. For example, the intake valve closing point may be so selected that, during the said expansion, the pressure in the cylinder falls to a value approximating or even slightly smaller than the value of the counter-pressure (P4) in the exhaust manifold conduit (FIG. 4).

In FIG. 4 are shown four curves $G_1$, $G_2$, $G_3$, $G_4$ relating to the pressure in the cylinder under heavy loads. The four curves correspond to the cases of, respectively, an engine with a conventional timing diagram (intake closing RFA at about 35° AM after bottom dead center) and an engine with a timing diagram according to the invention, with intake closing substantially at bottom dead center (AFA=0), at 10° AM (AFA=−10°) and at 20° AM (AFA=−20°) before bottom dead center.

As a result, no really significant gas exchange takes place between the exhaust manifold and the cylinder during stage IV (FIG. 2) in view of the relationship between the pressure in the cylinder and the mean pressure in the exhaust during this stage IV of exhaust valve opening. Consequently, the pressure at the end of the compression stroke and the maximum combustion pressure are, in this case, controlled as well by the choice of the fixed closing angle of the intake valve, as in the case in the Miller system with an intake closing lead that is variable and maximum at full loads. It should also be observed that, whatever the engine speed, re-induction of the scavenging air present at the inlet of the exhaust conduit during stage IV (FIG. 2) is all the more limited or totally non-existent as the load increases, this increase in load being represented by the increase of the P3/P4 ratio in FIG. 3. In order words, the maximum combustion pressure limitation occurs at the instant when such limitation is most necessary.

Under medium loads (substantially from 10% to 50% power, FIG. 3).

In this case, the scavenging ratio is all the more reduced as the load is lighter, for the P3/P4 ratio diminishes gradually (FIG. 3), but this ratio is sufficient (in both variants a and b of the invention represented in FIG. 2) to ensure the presence of a certain amount of air upstream of the exhaust manifold conduit.

As illustrated in FIG. 3 for a propeller law (given solely by way of example), the gradual reduction of the P3/P4 ratio (simultaneously with the load) results in a higher mean exhaust pressure than the pressure in the cylinder which would prevail in the latter if no opening of the exhaust valve in stage IV (FIG. 2) took place.

Otherwise stated, the re-induction, during stage IV, of the fresh scavenging air stored upstream of the exhaust collector during the preceding scavenging stage, allows a higher trapping efficiency than the one which would be obtained in the absence of stage IV, but with an intake valve closing point near or slightly before bottom dead center.

In this case, the trapping efficiency is determined not by the closing of the intake valve but by that of the exhaust valve.

In the range of loads considered, where there is no limitation to the maximum combustion pressure, it is thus possible to increase the effective compression ratio, the trapping efficiency and the excess of combustion air. The problems arising under partial loads in highly supercharged engines are thus minimized.

Starting and very light loads (from 0 to 10% power, FIG. 3).

FIG. 2 shows that, below 10% power, the scavenging rate is rapidly reduced to zero since the counter-pressure at exhaust (P4) becomes equal and even greater than the intake pressure (P3).

As in the case of partial loads examined above, the combination, on the one hand, of advanced closing of the intake valve with respect to bottom dead center, which allows air expansion in the cylinder, and on the other hand, of the presence of stage IV (FIG. 2) ensures not only the maximum effective compression ratio of the engine but also an automatic re-induction of a portion of the combustion gases of the preceding exhaust cycle after the first explosion, without it being necessary to artificially increase the counter-pressure at exhaust by means of devices known per se, such as valves.

In the present case as in the foregoing one, the effective compression ratio is determined by the exhaust closing instant and not by the intake valve closing. This re-induction of the burned gases and the high effective compression ratio thus maintained effectively lead to the solution of the starting and very-light-load operation problems.

Referring to FIG. 5, there is seen a common graphic representation of two series of curves, wherein C1–C4 correspond to the total volumetric efficiency ($\rho vt$), whereas curves D1–D4 correspond to the trapping efficiency ($\rho t$) as a function of power (according to the helix law).

These curves relate to the following cases:
curves C1–D1: an engine with conventional valve timing diagram with intake valve closing at about 35° of crank-shaft rotation after bottom dead center;
curves C2–D2: an engine to which the Miller system is applied, with the instant of intake valve closing varying according to load (between 10° of crank-shaft rotation before bottom dead center and 30° of crank-shaft rotation after bottom dead center);
curves C3–D3: an engine to which the method according to the invention is applied, with fixed intake closing near 10° of crank-shaft rotation before bottom dead center and fixed exhaust closing near 30° of crank-shaft rotation after bottom dead center;
curves C4–D4: an engine in which the intake valve closing is fixed and located substantially at bottom dead center, but without maintaining the opening of or re-opening the exhaust valve near bottom dead center (presently known as the Atkinson cycle), the closing instant being for example at 10° of crank-shaft rotation before bottom dead center; it should be noted that curve C4 practically coincides with the preceding curve C3.

Figure 6:
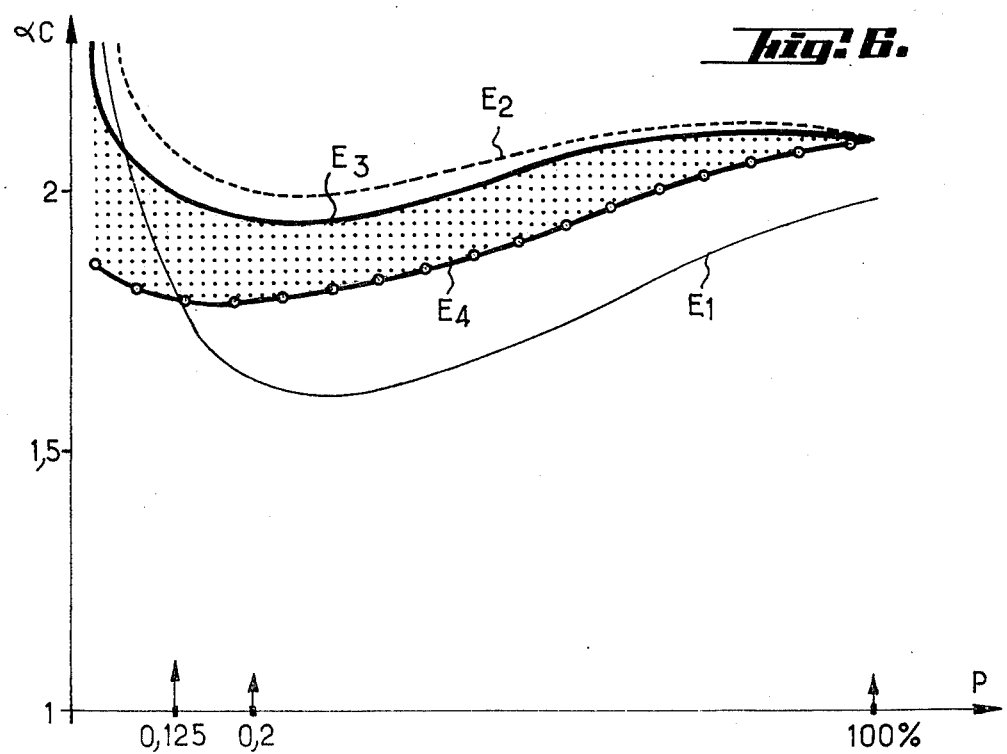
FIG. 6 shows graphically the excess of combustion air ($a$ $c$) in the cylinder as a function of power (according to the propeller law) for different timing diagrams including the one according to the invention.

Referring now to FIG. 6, there are seen in one and the same graph different curves E1–E4 showing the excess of combustion air in the cylinder as a function of power (according to the helix law). These different curves are to be associated with the four cases of operation, respectively, considered with reference to FIG. 5.

Before drawing inferences from the curves of FIGS. 5 and 6, it is preferable to first give an exact definition of the trapping efficiency, the total volumetric efficiency, the scavenging ratio and the excess of air:

$$\text{Trapping efficiency, } \rho_t = \frac{\text{Mass of air contained in cylinder after intake closing.}}{\text{Mass of air contained in unitary displacement volume under temperature and pressure conditions prevailing at cylinder inlet (i.e. the density of air at intake).}}$$

$$\text{Total volumetric efficiency, } \rho_{vt} = \frac{\text{Mass of air flowing through intake valve during an intake cycle}}{\text{Mass of air contained in unitary displacement volume under temperature and pressure conditions prevailing at cylinder inlet.}}$$

$$\text{Scavenging ratio} = \rho_{vt} - \rho_t$$

$$\text{Excess of combustion air} = \frac{\text{Amount of air in cylinder}}{\text{Amount of air stoechiometrically necessary to burn the amount of fuel introduced into the cylinder.}}$$

The curves of FIGS. 5 and 6 relate to the various cases of operation considered, at one and the same maximum combustion or 100% nominal power, which implies that in an engine to which the Miller system is applied, an engine using the method according to the invention and an engine with fixed intake closing but without exhaust valve opening or re-opening, the supercharging pressure is higher at nominal power than in the case of an engine with a conventional valve timing diagram.

By comparing the various curves, it is seen that the advantage gained by the use of the invention is quite considerable in comparison to an engine using a conventional timing diagram and is not inconsiderable compared with an engine in which the closing of the intake valve is fixed and located before bottom dead center (curve D4) but in which the exhaust valve is not maintained open or re-opened. The shaded region in FIG. 6 indicates the gain produced by the invention (E3) with regard to the Atkinson cycle (E4) in the matter of excess of combustion air, this gain directly follows the respective variations of the trapping efficiency $\rho_T$ illustrated by curves D3–D4 of FIG. 5.

It should also be observed that the results offered by the invention are close to those given by an engine to which the Miller system is applied, but without having the complexity of such a system, for it avoids the use of a variable timing gear controlled according to load and/or speed (curves D2, E2 respectively, for the Miller system).

Moreover, the Miller system does not offer the advantage of re-inducting an amount of hot gases under very light loads.

Referring to FIGS. 7 and 8, there will now be described two forms of embodiment allowing exhaust valve lifts in accordance with curves A2b and A2a, respectively. To this end, it is sufficient to slightly alter the profile of the exhaust valve actuating cam.

The actuating cam 1b represented in FIG. 7 has a conventional main projection 2 ensuring the exhaust valve lift (H) and an additional projection 3 for maintaining a residual opening (h) of the exhaust valve during the major part of the intake stage and beyond it. Since there is no complete closing of the exhaust valve after the period of complete opening thereof, the opposite ends of the additional projection 3 connects substantially continuously and smoothly with the main projection 2 and the circular base profile 4, respectively, of cam 1b.

The actuating cam 1a illustrated in FIG. 8 differs from the actuating cam 1b only by the fact that the additional projection 3 is separated from the main projection, so as to close and then re-open the exhaust valve. In this case, therefore, both ends of the additional projection 3 connect with the circular base profile 4 of cam 1a.

Cams 1a and 1b cooperate for example with a roller 5 which follows the profile of the cams to ensure the corresponding lifts of the exhaust valve through the medium of a conventional rocker mechanism.

The method according to the invention not only improves engine operation under partial loads and during starting but can also be so used as to maintain the conditions under partial loads unchanged in order to increase the nominal power of the engine.

The said method, particularly the form of embodiment corresponding to curve A2b of FIG. 2, also makes it possible to supercharge small Diesel engines, particularly those with a precompression chamber and very high compression ratios, which it has hitherto been difficult to supercharge either for maximum pressure reasons when the compression ratio is maintained or for starting reasons when the compression ratio is reduced.

The invention may also apply to impulse or pulse-converter supercharging systems in some particular cases where there are regular and favorable intervals between the puffs from the successive cylinders.

Also to be noted is that the form of embodiment corresponding to curve A2a is particularly favorable to the cooling of the exhaust valve and therefore facilitates scavenging, especially in the case of very-high compression ratio engines or engines provided with a prechamber.

It is also possible, as shown in FIG. 10, to provide a reserve of fresh air immediately downstream of the exhaust valves through the medium of direct by-pass means (avoiding the cylinder) between the supercharging air intake conduit 12 and the exhaust conduit 14, in replacement of stage II of FIG. 2.

It is also possible to associate the operation of stage IV of FIG. 2 not with the reserve of air accumulated immediately downstream of the exhaust valves, but with a reserve of air directly connected with the supercharging air collector and the opening of which, during stage IV, is controlled by an additional intake valve, the connection between the intake manifold and this valve being adapted to be interrupted in particular under heavy loads. This variant is diagrammatically illustrated in FIG. 9 showing a cylinder 10 with at least one intake valve 11 associated with the conduit 12 of the intake manifold and at least one exhaust valve 13 associated with the conduit 14 of the exhaust manifold. There is advantageously provided a second intake valve 15 associated with an auxiliary conduit 16 connected to the conduit 12 of the intake manifold. A valve 17 is mounted for example in this auxiliary conduit to selectively interrupt the connection between the intake manifold and the valve 15.

It is important to note, by way of example, that the exhaust closing lag with respect to the intake closing corresponds to a rotation of the crank-shaft comprised between 0° and 70° and even more, with an intake closing taking place between 40° before bottom dead center and 10° after bottom dead center. Preferably, the exhaust closing lag corresponds to a crank-shaft rotation comprised between 25° and 45° after intake closing.

Of course, the invention is by no means limited to the forms of embodiment which have been given by way of example only and comprises all the technical means equivalent to the means described as well as their combinations should the latter be carried out and used within the scope of the following claims.

What is claimed is:

1. A method for improving the efficiency of a four-stroke-cycle supercharged diesel engine of constant pressure type, having a timing diagram which is constant in the engine cycle, including an overlap stage between the lift of at least one intake valve and at least one exhaust valve, the method comprising
closing the intake valve, in accordance with the Miller cycle, at a crankshaft rotation angle between 40° before bottom dead center and 10° after bottom dead center in order to automatically modulate the trapping efficiency of the engine cylinders,
at the end of said overlap stage partially closing the exhaust valve,
maintaining a partial lift of said exhaust valve during a major part of the intake stage, and
closing said exhaust valve beyond the instant of said intake valve closing, in order during gradual increase in engine load, to automatically and gradually reduce, from starting to nominal power, the effective compression ratio and the temperatures at the end of compression by concomitantly reducing the amount of gas or fresh air present in the exhaust conduit and consisting of burned gases or air reintroduced into the cylinder near bottom dead center, according to the natural variation of the relationship between the supercharging air pressure and the counter-pressure at the cylinder exhaust.

2. The method according to claim 1, wherein said exhaust valve closing is delayed with respect to said intake valve closing by a value corresponding to a crankshaft rotation from 0° to 70°.

3. The method according to claim 2, wherein the delaying of the exhaust valve closing with respect to the intake valve closing corresponds to a value of a crankshaft rotation from 25° to 45°.

4. A method for improving the efficiency of a four-stroke-cycle supercharged diesel engine of constant pressure type, having a timing diagram which is constant in the engine cycle, including an overlap stage between the lift of at least one intake valve and at least one exhaust valve, the method comprising
closing the intake valve, in accordance with the Miller cycle, at a crankshaft rotation angle between 40° before bottom dead center and 10° after bottom dead center in order to automatically modulate the trapping efficiency of the engine cylinders,
at the end of said overlap stage closing the exhaust valve, maintaining the exhaust valve closed during a major part of the intake stage, partially reopening the exhaust valve before the intake valve closing, and reclosing the exhaust valve beyond the instant of said intake valve closing, in order during gradual increase in engine load, to automatically and gradually reduce, from starting to nominal power, the effective compression ratio and the temperatures at the end of compression by concomitantly reducing the amount of gas or fresh air present in the exhaust conduit and consisting of burned gases or air reintroduced into the cylinder near bottom dead center, according to the natural variation of the relationship between the supercharging air pressure and the counter-pressure at the cylinder exhaust.

5. The method according to claim 4, wherein said exhaust valve reclosing is delayed with respect to the intake valve fixed closing by a value corresponding to a crankshaft rotation from 0° to 70°.

6. The method according to claim 5, wherein said delaying of the exhaust valve closing with respect to the intake valve closing corresponds to a crankshaft rotation from 25° to 45°.

* * * * *